United States Patent [19]
Lindner

[11] 3,809,434
[45] May 7, 1974

[54] BICYCLE WHEEL WITH RIM AND HUB MOUNTED REFLECTOR

[75] Inventor: Henry J. Lindner, Wood Dale, Ill.

[73] Assignee: Beatrice Foods Co., Chicago, Ill.

[22] Filed: May 19, 1972

[21] Appl. No.: 255,090

[52] U.S. Cl.............. 301/37 R, 350/99, 301/37 SA
[51] Int. Cl............................................. B60b 7/00
[58] Field of Search... 301/37 SA, 5 R, 5 VH, 37 R; 305/307, 99

[56] References Cited
UNITED STATES PATENTS
| | | | |
|---|---|---|---|
| 3,007,743 | 11/1961 | Lange | 301/37 SA |
| 3,310,357 | 3/1967 | Hogan | 350/99 |
| 2,344,542 | 3/1944 | Fike | 350/99 |

FOREIGN PATENTS OR APPLICATIONS
| | | | |
|---|---|---|---|
| 380,279 | 9/1932 | Great Britain | 350/99 |

Primary Examiner—Richard J. Johnson

[57] ABSTRACT

A bicycle having mounted on a circumferential wheel structure thereof a reflector element to provide side reflections when operating the bicycle. The circumferential wheel structure comprising the hub, or the rim, has a support bracket mounted thereto preferably by spot welds, and the reflector element is mounted to said support bracket either directly or indirectly where a backer plate is provided for the reflector element. A double reflector element may be provided for opposite side reflection, and the support bracket may be variously connected to the reflector alone, to the reflector and the backer plate, or to the backer plate alone.

2 Claims, 6 Drawing Figures

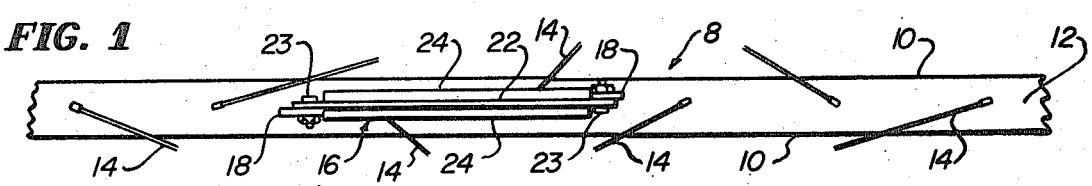
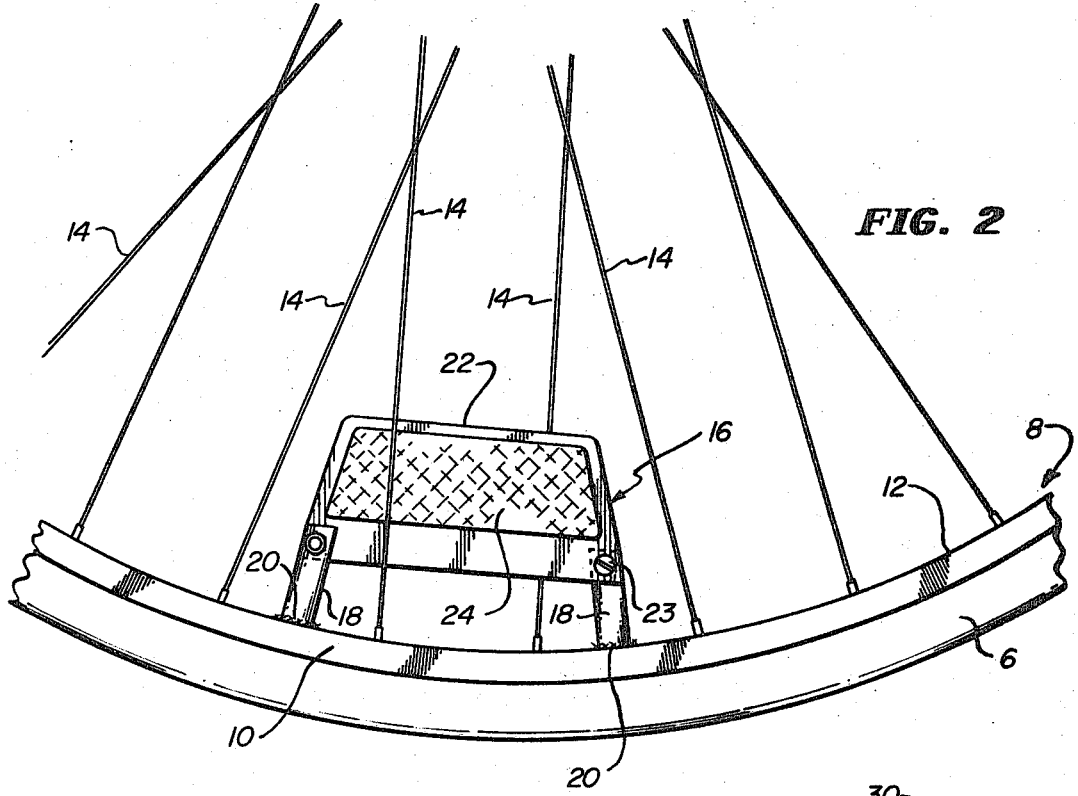
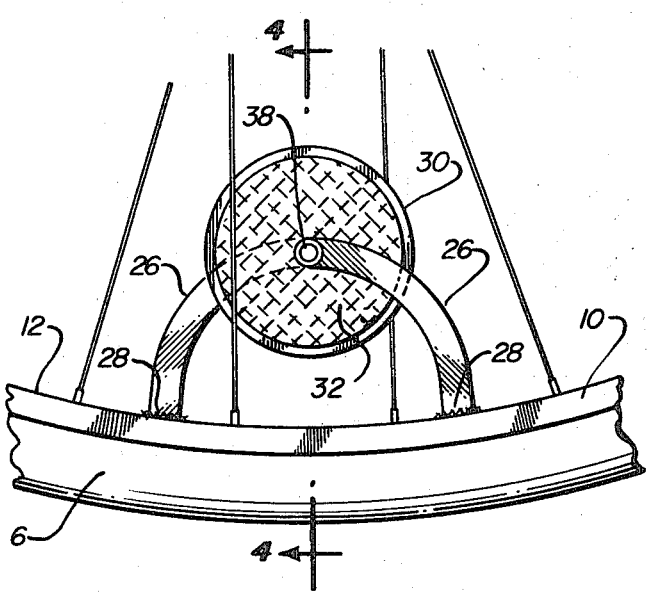
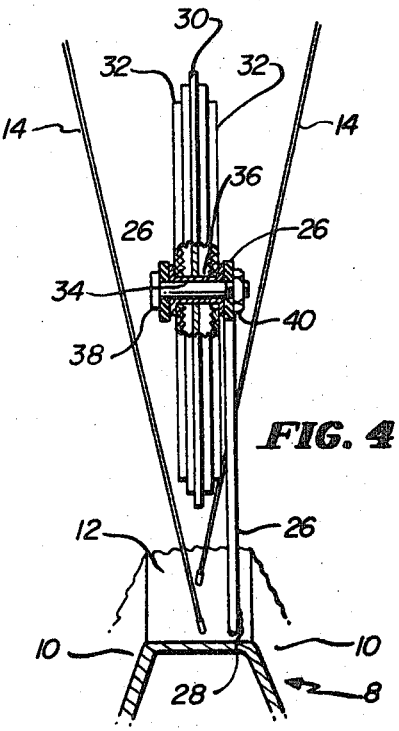

BICYCLE WHEEL WITH RIM AND HUB MOUNTED REFLECTOR

This invention relates to safety improvements for bicycle wheels, in particular, for side reflector elements mounted in fixed position to a rigid circumferential wheel structure, that is, the hub or the rim. It is desirable to provide side reflectors on bicycle wheels as a safety feature so that the headlights of cross traffic can detect a bicyclist by returning the light rays to the operator of a motor vehicle. A copending application by the same applicant, Ser. No. 228,175, filed Feb. 22, 1972, disclosed an improved spoke mounted reflector device. Such a device has many desirable features in that it can be quickly mounted between adjacent spokes of the wheel and a great many of such devices can be mounted on one or both sides of the wheel.

It is recognized that some owners of bicycles may not exert sufficient safety precautions in mounting such reflector devices and that it would be highly desirable to assure their presence on bicycle wheels. It is therefore desirable to provide bicycle wheels with premounted side reflectors having a reflector face in a plane which is parallel to the circumferential plane of the wheel so that the operating bicycle does provide reflecting signals to cross traffic in which the lights are operating.

It is accordingly one important object of the present invention to provide an improved bicycle wheel having premounted reflectors securely fixed to a rigid circumferential wheel structure, namely, the rim or the hub.

It is another important object of the present invention to provide such a wheel with premounted safety side reflectors without requiring seriously increased costs in the manufacturing of the bicycle wheel, or without requiring great structural modification or changes in the bicycle wheel.

Still yet another important object of the present invention is to provide a bicycle wheel with premounted safety side reflectors, said reflectors having reflector elements on one or both opposite sides of a bicycle wheel, and said reflector elements being supported by brackets mounted to either the rim or the hub after the bicycle wheel has been manufactured. The mounting is advantageously effected by quick economical means such as spot welding.

The foregoing objects are attained with still other objects which will occur to practitioners from time to time by the invention of the following disclosure, including drawings wherein:

FIG. 1 is a top elevational view of a portion of a bicycle rim showing a reflector mounted thereon;

FIG. 2 is a side elevational view of a structure shown in the view of FIG. 1;

FIG. 3 is a side elevational view similar to that of FIG. 2, but showing a mounted reflector of alternative embodiment;

FIG. 4 is a sectional view taken along line 4—4 of FIG. 3;

Figure 5:
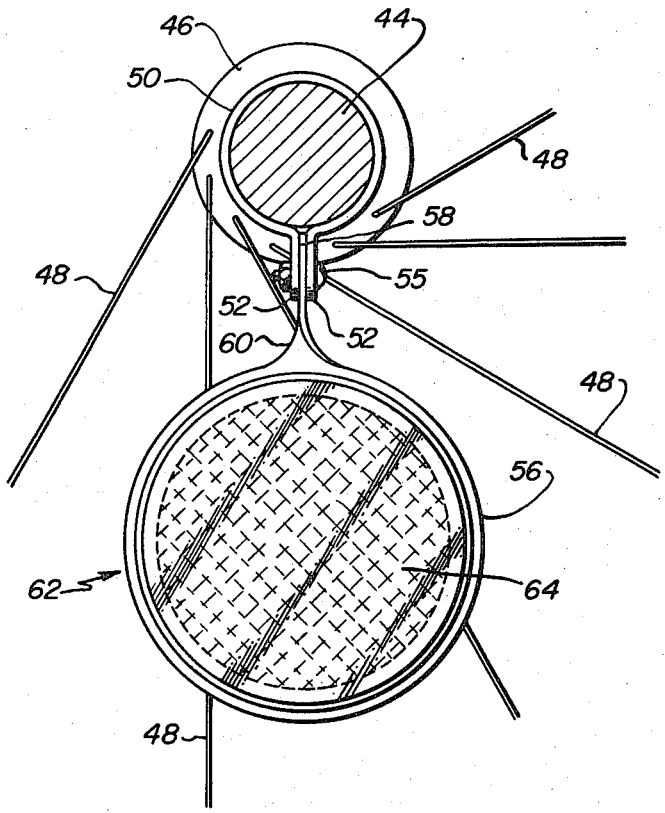
FIG. 5 is a side elevational view, partly in section, of a reflector device of alternative embodiment mounted to a hub of a bicycle wheel.

Referring first to the views of FIGS. 1 and 2 of the drawings, conventional pneumatic bicycle tires 6, are shown mounted on a wheel shown generally at 7. The wheel has the conventional circumferential wheel structures including rim 8, having tapered sides 10 and a planar top 12. A plurality of spokes 14 are affixed to the planar portion 12 of the rim in the usual way.

The top planar portion 12 is shown with a rim mounted reflector, generally 16. Support brackets 18 are mounted to the top of planar portion 12 by means such as spot welds 20. The brackets support the reflector 16, and are particularly shown as connected to a backer 22 by fasteners 23. A retrodirective reflector plastic element 24 is mounted on the backer 22, and the plane of said reflector 24 is parallel to the circumferential plane of the wheel 7.

The views of FIGS. 3 and 4 show an alternative embodiment for a reflector device and support brackets, particularly the use of curved brackets 26 joined to opposite sides of a double sided reflector device. Each curved bracket 26 is again mounted to the top planar portion 12 by quick, economical and efficient means such as spot welds 28. The reflector device itself includes a backer 30 having reflector elements 32 on each of the opposite sides. The backer and reflector elements have a common passageway 34 in which is mounted a hollow rivet 36. A fastener shown as an elongated screw 38 is used to hold the curved brackets to the opposite sides of the reflector device by passing through openings in the ends of the bracket. A nut 40 secures the curved brackets in mounting relationship to the reflector device.

In the foregoing embodiments, the support brackets are mounted to the top planar portion of a rim in a completely manufactured bicycle wheel, thereby not requiring any modifications in the actual manufacturing process of the wheel. It will further be seen that such support brackets are preferably not mounted to the tapered sides so as to provide no interference with hand operated brake elements. Mounting the support brackets to the top planar portion 12 is also preferable because of advantages in positioning and stability.

Figure 6:
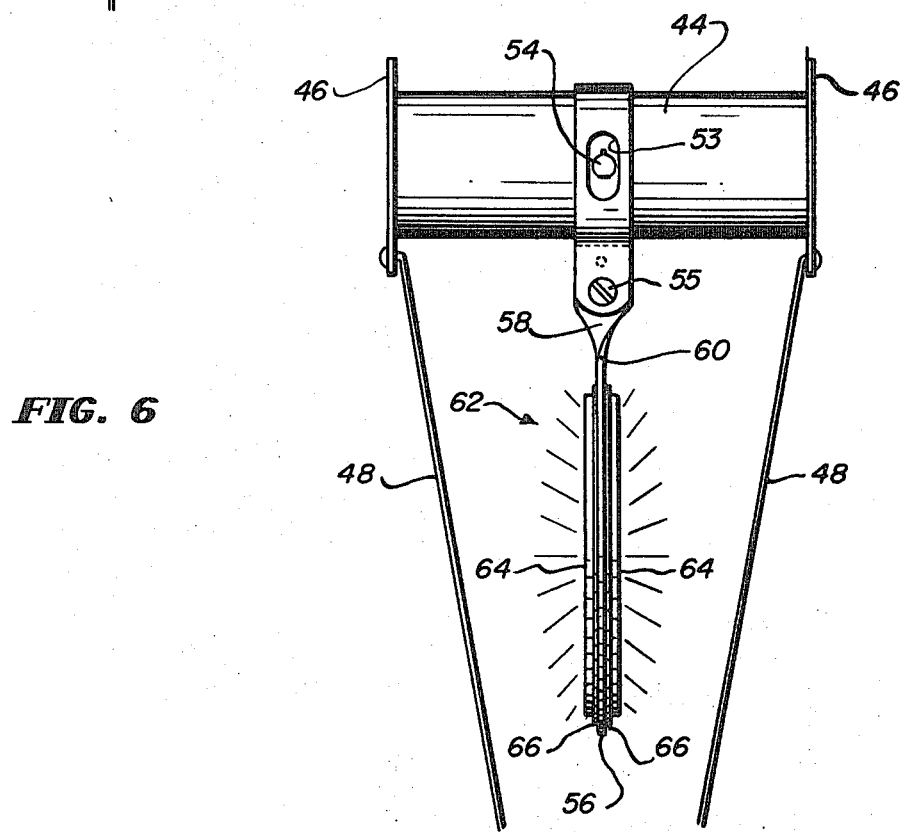
FIG. 6 is a front elevational view of the structure shown in FIG. 5, portions being removed from the views of FIGS. 5 and 6 for purposes of clarity.

The views of FIGS. 5 and 6 illustrate reflector devices mounted to another circumferential wheel structure, the hub 44. The hub is shown as a conventional hub flange 46 and the spokes 48, shown in part mounted to the hub flange 46.

While support brackets such as those illustrated in the foregoing FIGS. 1-4 can be mounted to the hub, the substantially smaller circumference of this circumferential wheel structure permits use of annular mounting brackets. An annular hub bracket or O-spring 50 is shown with outwardly bent legs 52. The annular bracket is shown with an opening 53 to accomodate lubrication cap 54 of the hub.

The outwardly bent legs 52 of the annular bracket have aligned openings to receive a fastener 55. The fastener, shown as a screw and bolt, holds a peripheral bracket or O-spring 56. The enlarged ends 58 of the peripheral bracket 56 are repositioned by a 90° twist 60 in the peripheral reflector bracket 56.

The peripheral reflector bracket 56 substantially follows the periphery of a hub mounted reflector 62. The illustrated hub mounted reflector has a pair of opposite reflector elements 64 mounted on a slightly enlarged backer 66. The peripheral reflector bracket 56 follows the periphery of the backer 66 to support the reflector device 62. The peripheral bracket may also be viewed as being connected to a non-reflector portion of the device or backer. Similar connections are shown in the embodiments of FIGS. 1 and 2, whereas FIGS. 3 and 4 show an embodiment where the support brackets are connected to a reflector portion of the device.

The premounted safety side reflector for bicycle wheels disclosed herein makes certain that the purchaser of the bicycle will display such side safety reflectors during its operation. The premounted safety side reflectors may be easily affixed after the bicycle wheel has been manufactured. This may be done by the bicycle manufacturer or by a special job shop. No interference or modifications of the standard bicycle wheel manufacturing procedure is required since the mounting is done quickly and economically by means such as spot welding.

The claims of the invention are now presented, and the terms thereof should be further considered in view of the language in the preceding disclosure and the views of the preceding drawings.

I claim:

1. In a bicycle wheel having a hub and rim as a circumferential wheel structure, the improvement which comprises a support bracket mounted to the circumferential wheel structure, said support bracket extending towards a point intermediate the hub and rim of the bicycle wheel, a reflector element connected to said support bracket, said reflector element having at least one reflecting face which lies in a plane that is parallel to the circumferential plane of the bicycle wheel, said reflector and backer plate having a common passageway located substantially at a central portion of said reflector element, a fastener in said common passageway, said support bracket mounted to said fastener, and a second support bracket connected to said fastener on a side opposite to the side where the first support bracket is connected to said fastener.

2. In a bicycle wheel which includes the features of claim 1 above, wherein a plastic reflector element is mounted on each side of a backer plate, and wherein said first support bracket extends from the fastener to the rim of the bicycle wheel, and said second support bracket extending from said fastener to the rim in a direction opposite to said first support bracket, and said support brackets mounted to said rim by spot welds.

* * * * *